United States Patent [19]

Seidel

[11] 3,913,790
[45] Oct. 21, 1975

[54] MEDICAL TESTING DEVICE

[76] Inventor: Nancy Anne Seidel, 20 Mitchell Lane, Chagrin Falls, Ohio 44022

[22] Filed: Aug. 23, 1974

[21] Appl. No.: 500,158

[52] U.S. Cl. ............... 222/132; 222/139; 222/442; 141/326; 23/253; 209/DIG. 20
[51] Int. Cl.² .......................................... B67D 5/60
[58] Field of Search ............. 137/265; 23/259, 253; 141/1, 83, 241, 237, 238, 273, 274, 319–322, 325, 326, 363–368, 100; 195/103.5, 120, 127; 222/132, 134, 137, 139, 362, 442; 209/DIG. 20; 221/277

[56] References Cited
UNITED STATES PATENTS
3,723,851  3/1973  Johnson et al. .................... 222/132

Primary Examiner—Houston S. Bell, Jr.
Attorney, Agent, or Firm—Meyer, Tilberry & Body

[57] ABSTRACT

A medical testing device for mixing first and second liquids in a preselected ratio and especially adapted for testing the sugar content in urine. The device includes a housing having an outer surface and a chamber therein. First and second liquid inlet passageways extend from the outer surface of the housing and internally thereof and are adapted to receive unmeasured quantities of the first and second liquids. Each of the first and second inlet passageways has an outlet end. A transfer element having two cavities with volumes calibrated proportional to said preselected ratio. The element is movable in the housing between a first position with one of the cavities aligned with each of the outlet ends of the liquid inlet passageways and a second position with the cavities aligned with the housing chamber whereby measured volumes of liquid in the cavities are deposited into the chamber for mixing and testing.

7 Claims, 7 Drawing Figures

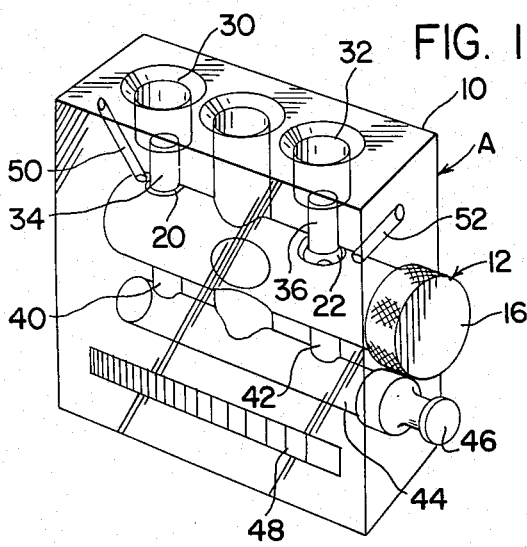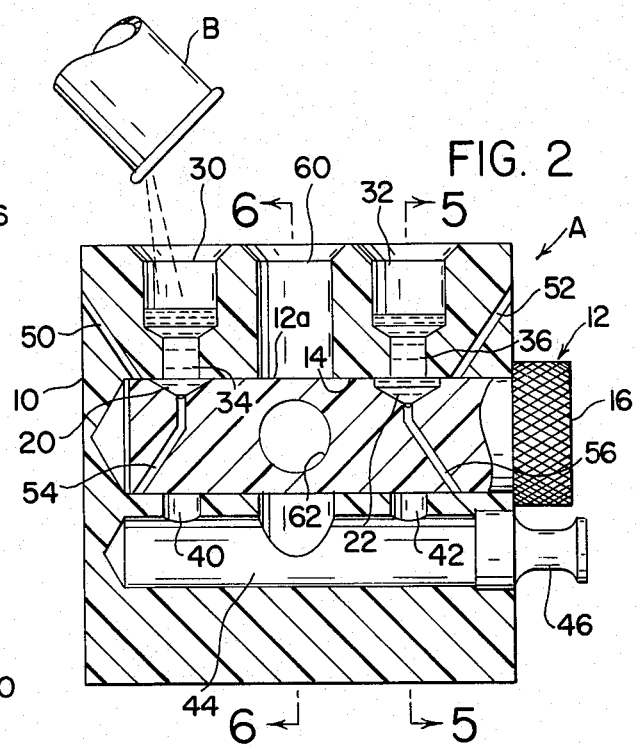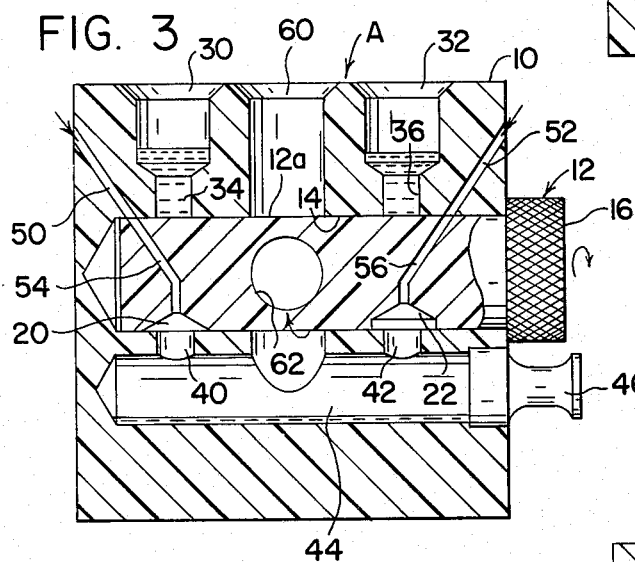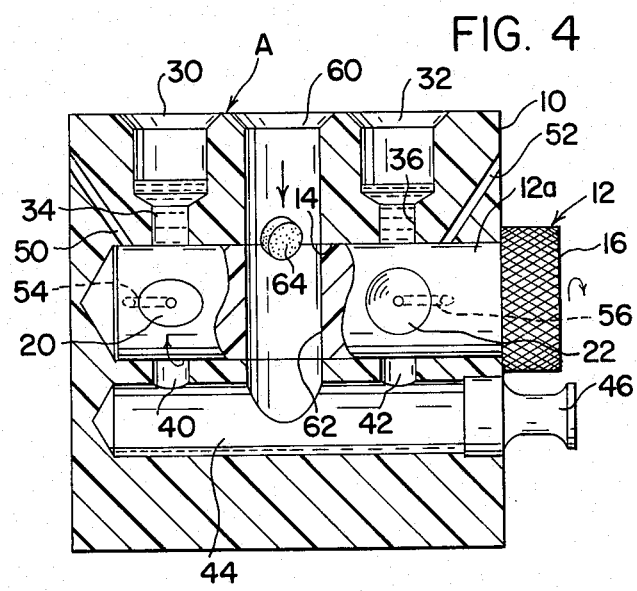

MEDICAL TESTING DEVICE

This invention relates to the art of medical testing devices and particularly to a medical testing device for testing the sugar content of urine.

The invention is particularly applicable for testing the sugar content of urine in a diabetic patient, which testing can be done quite easily at home. The invention will be described with particular reference to this home use; however, the device has broader applications and may be used in clinics, hospitals and doctor's offices for testing the sugar content of urine and other types of medical testing which involves mixing small measured amounts of different liquids in a mixing and testing chamber.

In testing the sugar content of a person's urine, the urine is mixed with water in a preselected ratio. A reagent tablet is placed within the mixture. The resultant color of the mixture is indicative of the sugar content. This procedure is generally performed in a test tube or similar clear receptacle. The most common procedure is to mix two drops of urine with 10 drops of water before the reagent tablet is inserted into the mixture. This procedure requires accurate measurements to obtain the two drops and the 10 drops. A trained laboratory technician is usually needed to perform this testing procedure.

A person who has diabetes requires frequent testing of the sugar level within the urine to provide warning of excessive levels. Since the patient cannot visit a doctor's office, clinic or hospital every time a test should be run, out patients are required to perform the urine test at home. This presents serious difficulty because of the accuracy required in making the mixture prior to inserting the reagent tablet. In some instances, too much urine is placed in the test tube or other testing device. Thus, home testing of diabetics is somewhat ineffectual or requires substantial dexterity and training.

The present invention relates to an improvement in a medical testing device of the type adapted for testing the sugar content of urine, which device overcomes the prior difficulties and can be conveniently used by both old and young patients at home with accurate and consistent results.

In accordance with the present invention, there is provided a medical testing device for mixing first and second liquids in a testing chamber, such as urine and water for subsequent exposure to a reagent tablet of various types. One of these reagent tablets is sold under the trademark "Clinitest" by Ames Company, a division of Miles Laboratories of Elkhart, Ind. The device includes a housing having an outer surface and a chamber. First and second liquid inlet passageways in the housing extend from the outer surface of the housing and are adapted to receive unmeasured quantities of the first and second liquids. Each of the first and second inlet passageways has an outer outlet end. A transfer element having two cavities with calibrated volumes is movable within the housing between a first position with one of the cavities aligned with each of the outlet ends of the inlet passageways and a second position with the cavities aligned with the housing chamber. In this manner, measured volumes of the two liquids, urine and water, in the calibrated cavities are deposited in the mixing or housing chamber for mixing and subsequent testing by the use of a reagent tablet.

The primary object of the present invention is the provision of a medical testing device for mixing measured quantities of first and second liquids in a mixing chamber, which device is easy to operate, small in size and consistent in results.

Yet another object of the present invention is the provision of a medical testing device for mixing measured quantities of first and second liquids in a mixing chamber, which device can be used at home or in a clinic, hospital or doctor's office.

Still a further object of the present invention is the provision of a medical testing device of the type defined above which device is compact and somewhat inexpensive.

Still further objects and advantages wil become apparent from the following description taken together with the accompanying drawings in which:

FIG. 1 is a pictorial view illustrating the preferred embodiment of the present invention;

FIG. 2 is a cross-sectional view of the preferred embodiment of the invention as shown in FIG. 1;

FIG. 3 is a view similar to FIG. 2 showing a second position of the transfer element in the preferred embodiment of the invention;

FIG. 4 is a further view similar to FIG. 2 showing still a further position of the transfer element in the preferred embodiment of the invention;

Figure 5:
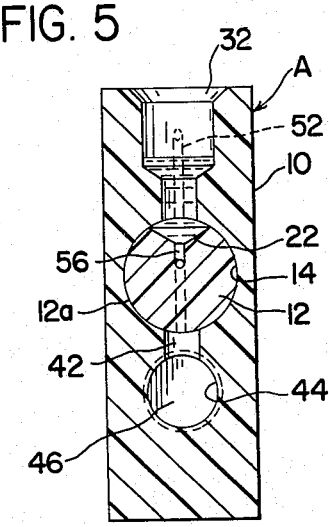
FIG. 5 is a cross-sectional view taken generally along lines 5—5 of FIG. 2.
Figure 6:
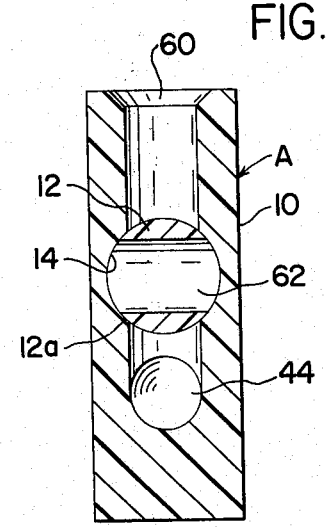
FIG. 6 is a cross-sectional view taken generally along line 6—6 of FIG. 2.

Referring now to the drawings where the showings are for the purpose of illustrating a preferred embodiment of the invention only, and not for the purpose of limiting same, a medical testing device A is used for testing liquid contents, such as the amount of sugar in urine. Device A includes a clear plastic housing 10 formed from various materials such as cast acrylic plexiglas and having a rotatable transfer element 12 with a cylindrical outer surface 12a journalled within a cylindrical bore 14. The element can be selectively rotatable by an outwardly extending knurled knob 16. The transfer element includes two calibrated cavities 20, 22. In accordance with the preferred embodiment of the invention, cavity 20 is smaller than cavity 22 and is proportioned to produce a volume equal to two drops of urine. Cavity 22 in the preferred embodiment, is proportioned to have a volume corresponding to 10 drops of water. At the upper portion of housing 10, there are provided two spaced liquid inlet passageways or bores 30, 32 having lower ends 34, 32, respectively. These ends are produced by reduced bores generally concentric with the bores 30, 32, respectively. The lower ends 34,36 are aligned with cavities 20, 22, respectively, in the rotatable transfer element 12. Below the transfer element there are provided in the housing two lower bores 40, 42 which communicate with a lower mixing or testing chamber 44 which is clearly visible through the plastic material forming housing 10. A movable plug 46 is slidably received in one end of chamber 44. The plug has an increased bore diameter to prevent inward movement of the plug beyond the position shown in FIG. 2. A color scale 48 is provided adjacent mixing and testing chamber 44 to be compared with the color of the liquid within the chamber in a manner to illustrate the sugar content of the urine being tested. Air vents, 50, 52 are provided within housing 10 and correspond with air vents 54, 56, respectively, in transfer element 12. When transfer element 12 is in the position shown in FIG. 3, the air vents mutually align themselves to provide air to the underside of measured or calibrated cavities 20, 22. In other positions, the air vents are misaligned and are blocked at the bore 14, as best shown in FIG. 2. A central passage 60 extends from the outer surface of housing 10 to the mixing and testing chamber 44. An opening 62 extending through transfer element 12 has a dimension generally corresponding to the dimension of bore 60 so that a given position of the transfer element will allow access through bore 60 to the mixing and testing chamber 44 as shown in FIG. 4. A reagent tablet 64 can then be dropped through the bore 60 into the mixing chamber for action upon the mixture within the chamber. In accordance with the preferred embodiment of the invention, the reagent tablet is sold under the trademark CLINITEST by Ames Company, a division of Miles Laboratory of Elkhart, Ind. Other similar tablets are available for this purpose.

In operation, the transfer element 12 is rotated into a first position shown in FIG. 2. In this position, cavities 20, 22 are aligned with the lower ends 34, 36 of the inlets 30, 32. Urine from a vial or container is poured in an unmeasured amount into inlet passageway 30. The fit between a cylindrical portion 12a of transfer element 12 and bore 14 is sufficiently close to prevent leakage around the bore. Thus, urine within calibrated cavity 20 does not flow from the cavity and the additional amount poured into inlet 30 accumulates above the cavity, as shown in FIG. 2. In a like manner, water, in an unmeasured amount, is pured into inlet passageway or bore 32 so that a measured amount is accumulated within cavity 22. Because of surface tension and air within the vent passages 54, 56, liquid generally does not flow from cavities 20, 22 into these air vents. Any minor amount of liquid in these vents will be expelled when the transfer element 12 is moved to the second position shown in FIG. 3. In this position, transfer element 12 has been rotated 180° by knob 16. This aligns cavities 20, 22 with lower bores 40, 42, respectively. In this manner, the measured amount of liquid within the calibrated cavities flows into the mixing chamber 44 to provide a mixture having a preselected ratio. In the position shown in FIG. 3, the air vents 50, 52, and 54, 56 are aligned to direct or vent air to the underside of cavities 20, 22. This assures release of any liquid in these cavities for depositing in chamber 44. In some instances, the liquid tension may hold liquids within chamber 20, 22 without this venting structure.

After the transfer member 12 has been rotated to the position shown in FIG. 3, it is necessary to deposit a reagent tablet within the mixture contained in chamber 44. This is done by rotating transfer element 12 90° into the position shown in FIG. 4. This aligns opening 62 with bore 60. The reagent tablet 64 can then be dropped through bore 60 directly into the mixing chamber. Thereafter, the transfer element 12 is moved into the position shown in FIG. 2 and the testing device A can be agitated manually to dissolve tablet 64 within the mixture of liquid in chamber 44. The color of the treated mixture is compared with the color variations on scale 48 to determine the approximate sugar content of the tested urine. Thereafter, plug 46 is withdrawn and chamber 44 is emptied. Of course, the chamber could be emptied through bore 62 when in the position shown in FIG. 4. In addition, the mixture in chamber 44 could be poured into another container for reaction with a reagent tablet.

This provides a convenient, compact device for mixing two liquids into a given ratio and then testing the mixture in the same device which can be handled by any patient. It has particular applicability to home use by a person unskilled in the procedure of testing the sugar content. The device assures accurate measurement and rapid operation without frustrations which can occur when other testing procedures are attempted by untrained persons.

Figure 7:
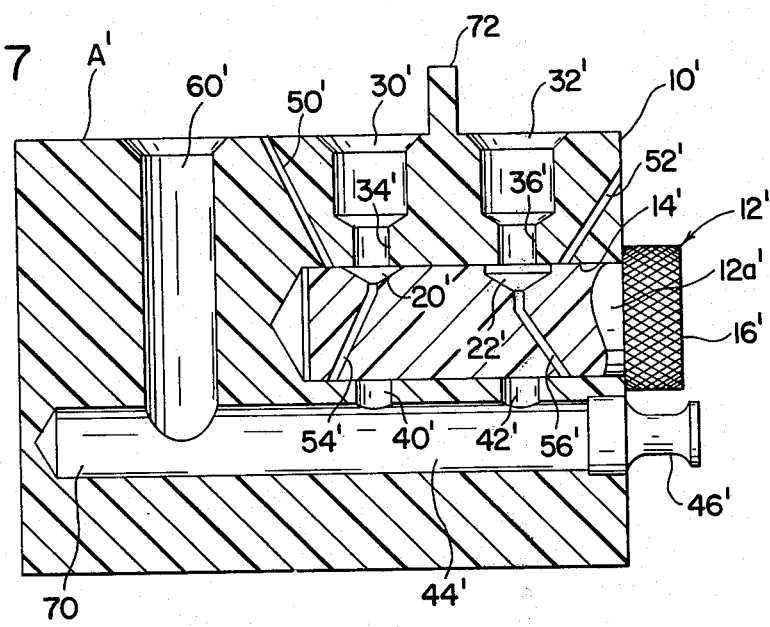
FIG. 7 is a cross-sectional view of a modification of the preferred embodiment of the invention.

Various modifications of the device A could be developed without departing from the intended spirit and scope of the present invention. One of these modifications is shown in FIG. 7 wherein the medical testing device A' includes certain features corresponding generally to the features shown in FIGS. 1–6. In this instance, the corresponding numbers with primes are used for the corresponding features of the modification shown in FIG. 7. In this device, passage or bore 60' does not extend through transfer element 12'. It intersects mixing chamber 44' at a point remote from the transfer element. Bore 70 which is an extension of chamber 44' has a sufficient volume to accept tablet 64 and the mixture from inlet passageways 30', 32'. In this manner, after the transfer element 12' has deposited the mixture within chamber 44', a tablet is dropped into the chamber through bore 60'. Thereafter, the testing device A' is rotated 90° in a clockwise manner to place the bore 70 at the lower end which will have a sufficient volume to accept the mixture and tablet. After agitation, the liquid within the bore 70 will assume a color corresponding to the sugar content of the urine being tested. Basically, this modified embodiment of the invention functions in the same manner as the preferred embodiment. As another feature, a partition 72 is located between inlets 30' and 32' and extends transversely across the top of device A'. In this manner, liquid being poured into the inlet passageways 30', 32' does not tend to spill over into the adjacent inlet passageway. This is very useful when the inlet passageways are fairly close together as shown in FIG. 7.

Other modifications of the invention could be made without departing from the intended spirit and scope of the invention as defined in the appended claims.

I claim:

1. A medical testing device for mixing first and second liquids in a testing chamber, said device comprising: a housing having an outer surface and a visable testing chamber; first and second liquid inlet passageways in said housing intersecting said outer surface and adapted to receive unmeasured quantities of said first and second liquids, respectively; each of said first and second inlet passageways having a lower outlet and; a transfer element having two cavities with calibrated volumes; means for moving said transfer element in said housing between a first position with one of said cavities aligned with and in communication with each of said outlet ends and a second position with said cavities aligned with said chamber whereby measured volumes of said liquids in said cavities are deposited into said chamber for mixing and testing; first and second air vent passageways extending in said housing from said outer surface; and, third and fourth air vent passageways in said transfer element and each communicated with one of said cavities, said first and third air vent passageways and said second and fourth air vent passageways being in communication when said transfer element is in said second position.

2. A medical testing device as defined in claim 1 wherein said transfer element is rotatable in said housing between said first and said second element.

3. A medical testing device as defined in claim 2 including a third inlet passageway extending from said outer surface of said housing to said chamber and means for forming an opening in said transfer element, and aligning said opening with said passageway to allow access to said chamber.

4. A medical testing device as defined in claim 3 wherein said transfer element is rotatable in said housing between said first and second position.

5. A medical testing device as defined in claim 1 wherein said housing is formed from a clear plastic material allowing visability of said chamber.

6. A medical testing device as defined in claim 5 wherein said transfer element is rotatable in said housing between said first and said second element.

7. A medical testing device as defined in claim 5 including a third inlet passageway extending from said outer surface of said housing to said chamber and means for forming an opening in said transfer element, and aligning said opening with said passageway to allow access to said chamber.

* * * * *